United States Patent
Murayama et al.

[11] Patent Number: 5,987,248
[45] Date of Patent: Nov. 16, 1999

[54] DEBUGGING INFORMATION DISPLAY DEVICE

[75] Inventors: Norihisa Murayama; Yuji Sato, both of Shizuoka; Masaki Aoki, Kawasaki; Kenichi Yamamoto, Shizuoka, all of Japan

[73] Assignee: Fujitsu Limited, Kawasaki, Japan

[21] Appl. No.: 08/739,964

[22] Filed: Oct. 30, 1996

[30] Foreign Application Priority Data

Mar. 27, 1996 [JP] Japan ..................................... 8-072015

[51] Int. Cl.⁶ ..................................................... G06F 11/00
[52] U.S. Cl. ................ 395/704; 395/183.01; 395/183.22
[58] Field of Search ................................... 395/704, 705, 395/706, 183.01, 183.14, 183.22

[56] References Cited

U.S. PATENT DOCUMENTS

| | | | |
|---|---|---|---|
| 5,179,702 | 1/1993 | Spix et al. | 395/672 |
| 5,210,859 | 5/1993 | Aoshima et al. | 395/183.22 |
| 5,247,696 | 9/1993 | Booth | 395/800.07 |
| 5,255,385 | 10/1993 | Kikuchi | 395/183.01 |
| 5,274,812 | 12/1993 | Inoue | 395/705 |
| 5,371,747 | 12/1994 | Brooks et al. | 395/183.14 |
| 5,446,900 | 8/1995 | Kimelman | 395/704 |
| 5,598,561 | 1/1997 | Funaki | 395/706 |

FOREIGN PATENT DOCUMENTS 59-197964  9/1984  Japan.

Primary Examiner—James P. Trammell
Assistant Examiner—Demetra R. Smith
Attorney, Agent, or Firm—Staas & Halsey

[57] ABSTRACT

A debugging information display device is provided which concurrently displays a source list and debugging information when the source list is displayed through a debugger. A vectorizing line extractor, a vectorizing degree analyzer and a breakpoint-logical vector length information fetching unit are provided on a compiler side, and debugging information is affixed to an execution program output from the compiler. A vectorizing degree fetching unit is provided on the debugger side, and displays, together with source lines, vectorizing lines to be vectorized and the corresponding vectorizing degree information fetched from the debugging information. Also, a logical vector length analyzer and a real vector length fetching unit are provided to display logical and real vector lengths simultaneously. Further, a breakpoint setting unit and a breakpoint information analyzer are provided so that set breakpoints and specifiable breakpoints can be displayed when the source is displayed.

16 Claims, 14 Drawing Sheets

PRIOR ART

```
>list
1           PROGRAM TEST
2           INTEGER I, X
3
4    V      DO 100 I=0, 100
5    V         X=X+1
6    V  100 CONTINUE
7
:
```

DEGREE OF VECTORIZING

FIG. 7

```
Break Point at 5
5   V       X=X+1
>show vl
Logical vector length: 100
Real vector length: 100
>
```

FIG. 10

```
>break 6
Break Point at 6
6   V 100 CONTINUE
>list
1 -       PROGRAM TEST
2            INTEGER I,X
3
4 -V      DO 100 I=0,100
5 -V         X=X+1
6 *V 100  CONTINUE
7
8 -       END
```

FIG. 13

DEBUGGING INFORMATION DISPLAY DEVICE

BACKGROUND OF THE INVENTION

1. Field of the Invention

The present invention relates to a debugging information display device displaying debugging information, and more particularly, to a debugging information display device displaying debugging information during debugging, so that a program can be debugged smoothly.

2. Description of the Related Art

Generally, in an environment in which a vector compiler is used to speed up execution of a program by a computer, the program can be debugged smoothly and the performance of the program improved if a vectorization status with respect to a source program and vector length status at the time of translation and execution are made known to the user when a debugger is used.

Also when a debugger is used, breakpoints are set interrupting execution of a program. If breakpoints that can be specified (i.e., specifiable breakpoints) and set with respect to a source program are known, the frequency of setting a breakpoint to an erroneous position is decreased and debugging can be performed smoothly.

FIG. 1 illustrates an example of a conventional debugging environment. Typically in a conventional environment in which a source program 1 is compiled by a compiler 2 running on a computer, the compiler 2 first analyzes vectorization information, outputs a source list 3 with the vectorization information in the form of a file remaining on the computer and/or printed on paper, and then outputs an execution (or object) program 4. The execution program 4 is output in the form of an executable program section 4a and specifiable breakpoint information 4b analyzed by the compiler 2. Subsequently, the execution program 4 is input to a debugger 5, which aids in debugging of the program. At the time of debugging, the source list 3 with the vectorization information previously output is required.

The source program 1 and the source list 3 are stored in a memory as part of a computer, and the compiler 2, the execution program 4, and the debugger 5 are executed by the computer (not shown in FIG. 1).

Thus, the vectorization information is output together with the source list 3 at the time of compiling. The source list 3 is indispensable to debugging of the execution program 4 using the debugger 5. Therefore, the source list 3 must be output each time the compilation of the source program 1 is performed by the computer. Further, since the execution program 4 to be debugged and its source list 3 previously output at the time of compiling are separate from each other, they may be mismatched when debugging is attempted.

In the conventional debugging environment, the vectorization information necessary for debugging is acquired from the source list. Thus it is necessary that the source list output be specified in advance at the time of compiling. Further, it is difficult to learn from the debugger alone the lines to be vectorized and their degree of vectorization with respect to the source program.

Although in a conventional compiler, logical vector lengths are defined at the time of translation, the logical vector lengths may turn into different real vector lengths for memory-related reasons when the execution program is actually executed. It is, however, extremely difficult to ascertain in the debugger the information about both the logical and real vector lengths at the same time.

Further, with the conventional debugger, the information about set breakpoints can be obtained. However, information on where breakpoints can be set is not displayed. Further, the source list output also does not include such information. Therefore, whether the execution program can be interrupted or not cannot be determined unless a breakpoint is actually set. In some debuggers, the breakpoint is set to a next line instead of the line at which the breakpoint is desired. In actuality, the program may not be interruptable exactly at a desired point. Thus, to locate a breakpoint which can be specified, a set command must be repeatedly executed, consuming labor for the setting of the breakpoint.

SUMMARY OF THE INVENTION

An object of the present invention is to provide a debugging information display device displaying vectorization information or specifiable breakpoint information, created through compiling, simultaneously with displaying a source list.

Another object of the present invention is to provide a debugging information display device displaying logical vector lengths defined at the time of translation and real vector lengths at the time of actual execution.

To achieve the above objects, a debugging information display device of the present invention is provided. The debugging information display device of the present invention comprises a vectorizing line extractor, a vectorizing degree analyzer, a vectorizing degree fetching unit, an information affixing unit, and a display.

The vectorizing line extractor detects a loop structure in a source program when the source program is translated by a compiling execution unit, to thereby extract a vectorizing line to be vectorized. The vectorizing degree analyzer analyzes a degree of vectorization with respect to a source of the extracted vectorizing line. The vectorizing degree analyzer affixes, as debugging information, information about the analyzed vectorizing degree to an execution program. The execution program includes a program section created by the compiling execution unit. The vectorizing degree fetching unit fetches the vectorizing degree information from the debugging information of the execution program. The information affixing unit is supplied with the source program and the fetched vectorizing degree information, and affixes the vectorizing degree information to a corresponding line of the source program. The display displays the source program with the vectorizing degree information affixed thereto.

The above and other objects, features and advantages of the present invention will become apparent from the following description when taken in conjunction with the accompanying drawings which illustrate preferred embodiments of the present invention by way of example and in which like numerals refer to like parts throughout and from the following claims.

BRIEF DESCRIPTION OF THE DRAWINGS

FIG. 7 is a diagram showing an example of how vectorization information is displayed by a debugger;

FIG. 10 is a diagram showing an example of how information about logical and real vector lengths are displayed by the debugger;

FIG. 13 is a diagram showing an example of how breakpoint information is displayed by the debugger.

DESCRIPTION OF THE PREFERRED EMBODIMENTS

Figure 1:
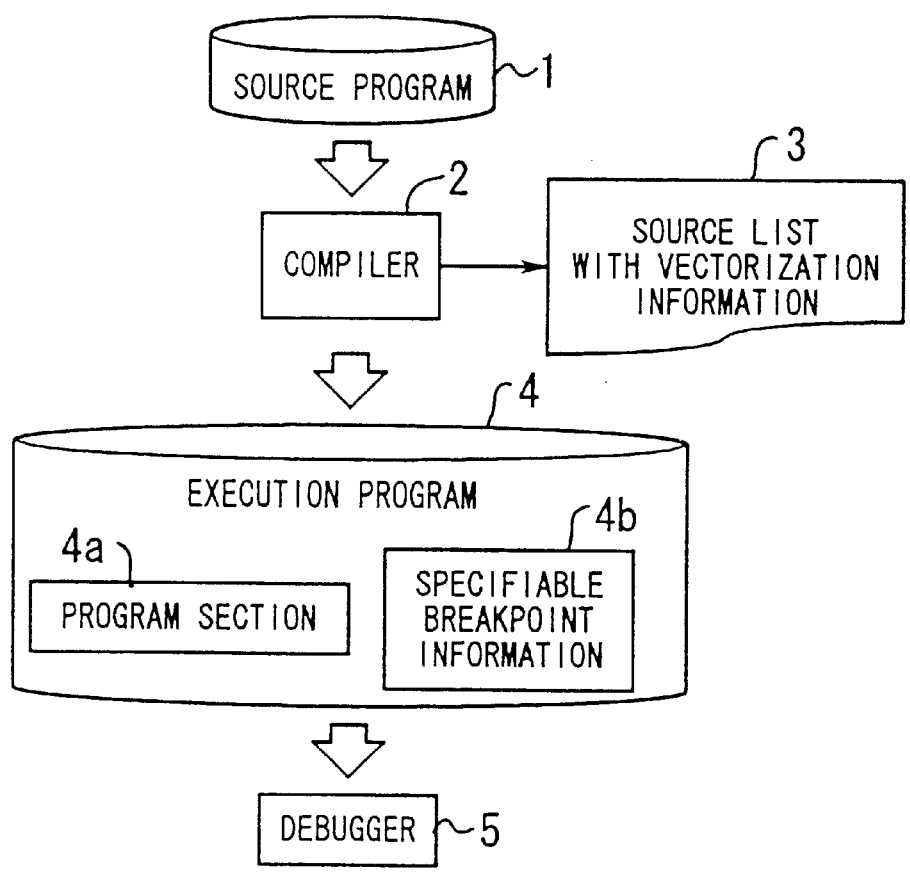
FIG. 1 is a diagram showing, by way of example, a conventional debugging environment.
Figure 2:
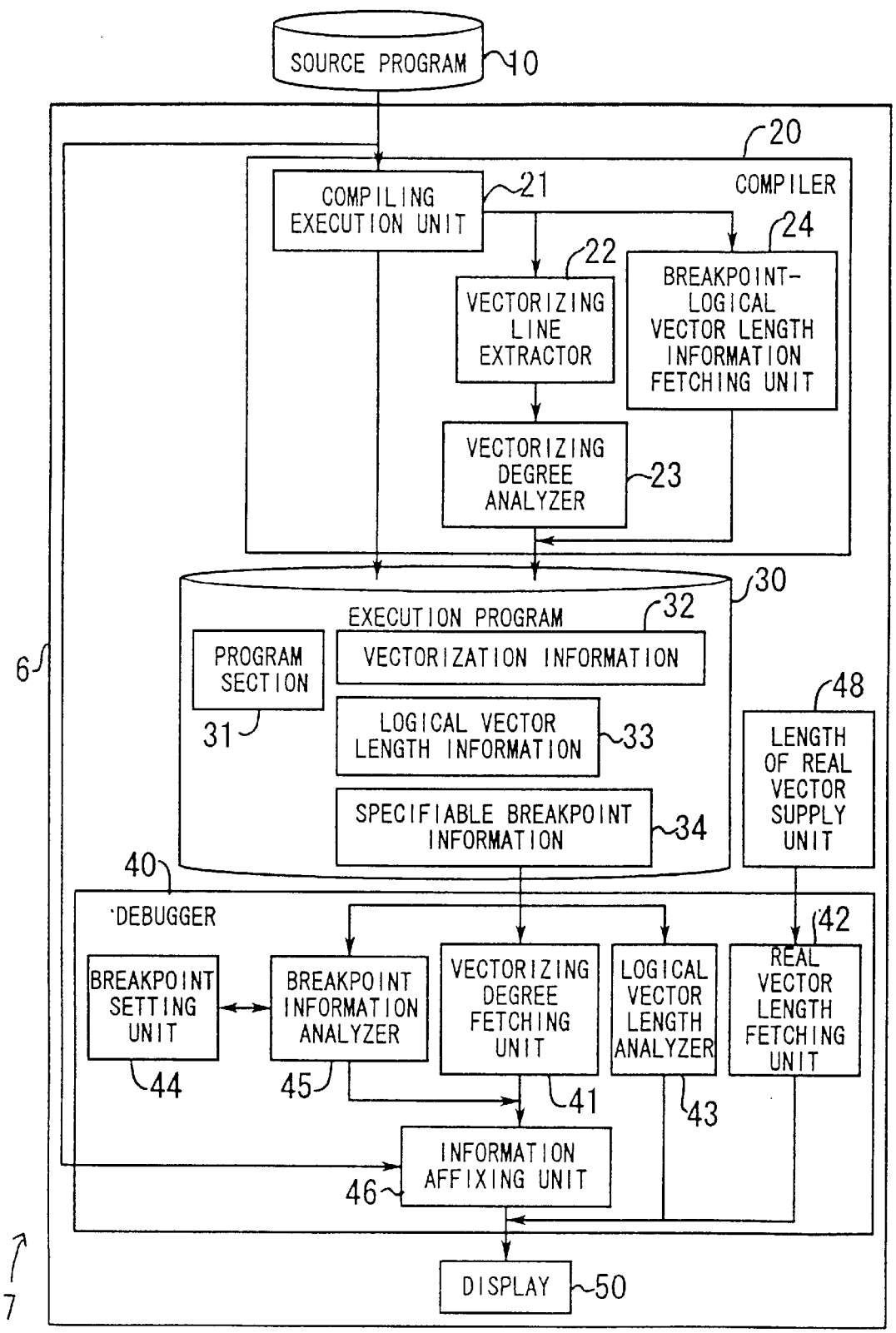
FIG. 2 is a diagram illustrating an example configuration of a debugging information display device according to the present invention.

An embodiment according to the present invention is hereinafter described with reference to the drawings. Referring first to FIG. 2, an outline of the present invention is explained.

FIG. 2 illustrates an example configuration of a debugging information display device according to the present invention.

As shown in FIG. 2, the debugging information display device 6 according to the present invention is included in a program development system 7 comprising a compiler 20 for compiling a source program 10, a debugger 40 for debugging an execution program 30 created by the compiler 20, and a display 50 displaying debugging information.

The compiler 20 comprises a compiling execution unit 21 substantially compiling the source program 10 and a vectorizing line extractor 22 extracting vectorizing lines. The vectorizing lines are objects to be vectorized and are detected when the source program is translated by the compiling execution unit 21. The compiler 20 further comprises a vectorizing degree analyzer 23 analyzing degrees of vectorizing of the vectorizing lines with respect to a source and outputting the result of analysis as debugging information, and a breakpoint-logical vector length information fetching unit 24 fetching information about logical vector lengths and breakpoints, defined at the time of translation of the source program, and outputting the fetched information as debugging information.

The execution program 30 comprises a program section 31 created by the compiling execution unit 21, and the debugging information. The debugging information comprises vectorization information 32 output from the vectorizing degree analyzer 23, and logical vector length information 33 and specifiable breakpoint information 34 output from the breakpoint-logical vector length information fetching unit 24.

The debugger 40 comprises a vectorizing degree fetching unit 41 fetching the vectorizing information 32 from the debugging information of the execution program 30. The debugger 40 further comprises a real vector length fetching unit 42 fetching real vector length information during a current break environment of the execution program, a logical vector length analyzer 43 extracting logical vector length information 33 during the current break environment from the debugging information of the execution program, a breakpoint setting unit 44 setting breakpoint information, a breakpoint information analyzer 45 extracting the specifiable breakpoint information from the debugging information of the execution program, and an information affixing unit 46 for attaching the vectorization information or the specifiable breakpoint information to the source program 10. The lengths of the real vectors are supplied to the real vector length fetching unit 42 by length of real vector supply unit 48.

With the arrangement described above, when the source program 10 is compiled by the compiler 20, the vectorizing line extractor 22 first extracts lines to be vectorized, then the vectorizing degree analyzer 23 analyzes the degree of vectorizing. In the foregoing analysis, the degree of vectorizing is classified into four types: (1) non-target for vectorizing, (2) perfect vectorization, (3) partial vectorization, and (4) non-vectorizing with respect to the source program 10. The breakpoint-logical vector length information fetching unit 24 fetches the information about the logical vector lengths and the breakpoints defined at the time of compiling the source program 10. The foregoing items of information are attached (or affixed), together with the vectorizing degree information, to the program section 31 created by the compiling execution unit 21, as debugging information, thereby obtaining the execution program 30.

In the debugger 40 shown in FIG. 2, on the other hand, the vectorizing degree fetching unit 41 extracts the vectorizing degree information from the debugging information of the execution program 30 and outputs the extracted information to an information affixing unit 46. The information affixing unit 46 attaches the vectorizing degree information to the source program 10 to be displayed by the display 50. If logical and real vector lengths are to be displayed concurrently, the real vector length fetching unit 42 fetches real vector length information during a current break environment of the execution program 30, while the logical vector length analyzer 43 extracts logical vector length information during the current break environment from the debugging information of the execution program 30.

The real vector length information and the logical vector length information are displayed by the display 50. The specifiable breakpoint information is extracted from the debugging information of the execution program by the breakpoint information analyzer 45, and then is attached to the source program 10 by the information affixing unit 46 to be displayed by the display 50. In this case, the breakpoint information analyzer 45 determines whether or not a breakpoint has been set with respect to a particular line in question by the breakpoint setting unit 44. If a breakpoint has been set, the breakpoint information analyzer 45 outputs information to that effect to the information affixing unit 46 to be displayed by the display 50.

Figure 3:
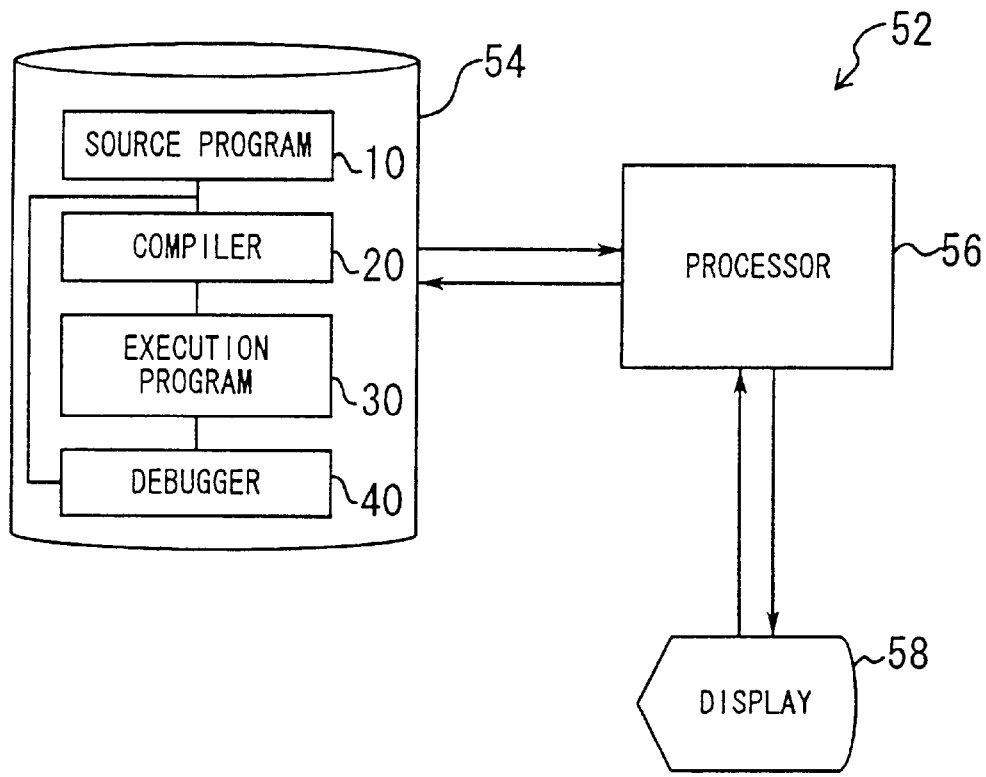
FIG. 3 is a diagram showing an example of a computer system executing the debugging information display device of the present invention.

FIG. 3 shows an example of a computer system implementing the debugging information display device of the present invention. As shown in FIG. 3, computer 52 comprises a memory 54, a processor 56, and a display 58. In a preferred embodiment of the present invention, the source program 10, the compiler 20, and the debugger 40 for debugging the execution program 30 created by the compiler 20 are software programs stored in the memory 54. Each of the foregoing software programs are executed by the processor 56. For example, the processor 56 fetches from memory the instructions of the compiler 20 to be executed.

Processor 56 executes the compiler 20 to compile at least one source program 10 into the execution program 30, in accordance with the present invention, as described herein. The execution program 30 is then stored in the memory 54 by the processor 56. Processor 56 then executes the debugger 40 and the execution program 30, and displays the above-mentioned information described using FIG. 2 on the display 58.

The embodiment of the present invention is now described in detail. First, processing of the debugging information created when a source program is analyzed by the compiler is explained.

Figure 4:
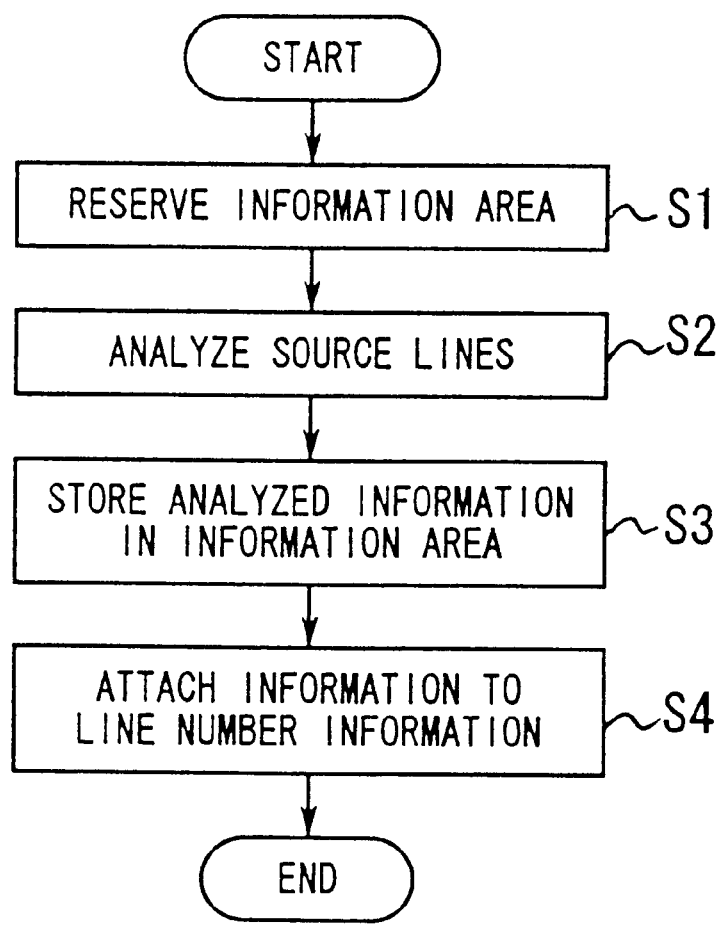
FIG. 4 is a flowchart showing a process flow on a compiler side.

FIG. 4 is a flowchart showing a process flow on the compiler 20 side of the present invention. The process flow shown in FIG. 4 is executed, for example, by the computer 52, shown in FIG. 3.

First, when a source program 10 is read and analyzed using the compiler 20, an information area is reserved in the memory 54 for temporarily storing analyzed information on a line-by-line basis (Step S1). Then, each source line of the source program 10 is analyzed using the compiler 20 (Step S2). At this time, according to an optimized phase in particular, the degree of vectorizing is analyzed. In this embodiment, the degree of vectorizing for each source line is classified into one of the following four types: (1) non-target for vectorizing which indicates that the analyzed source line is not an object to be vectorized, (2) perfect vectorizing, (3) partial vectorizing, and (4) non-vectorizing.

As such vectorizing degree information, a space " " is used to indicate that the line in question is not an object of vectorizing, "V" is used to indicate that the line is an object of vectorizing and can be perfectly vectorized, "M" is used to indicate that the line is an object of vectorizing and can be partially vectorized, that is, the line includes a portion which can be vectorized and also a portion which cannot be vectorized, and "S" is used to indicate that the line is an object of vectorizing but cannot be vectorized (and is referred to as "non-vectorizing").

Simultaneously, analysis is performed for each source line as to the logical vector length and as to whether or not a breakpoint can be set. In this case, for a non-vectorized line, "0" is set as the logical vector length. The breakpoint information and the logical vector length information have the same format; therefore, in the example shown in FIG. 4, the logical vector length information also represents the breakpoint information. The thus-analyzed information of the vectorizing degree and the logical vector length is stored in the information area of the memory 54 previously reserved (Step S3).

When an execution program 30 is output, the information on the vectorizing degree and the logical vector length, stored in the information area, is attached to line number information in the debugging information (Step S4). In this case, all source file names used in the compilation of the execution program 30 are recorded in the debugging information, in accordance with the present invention.

Figure 5:
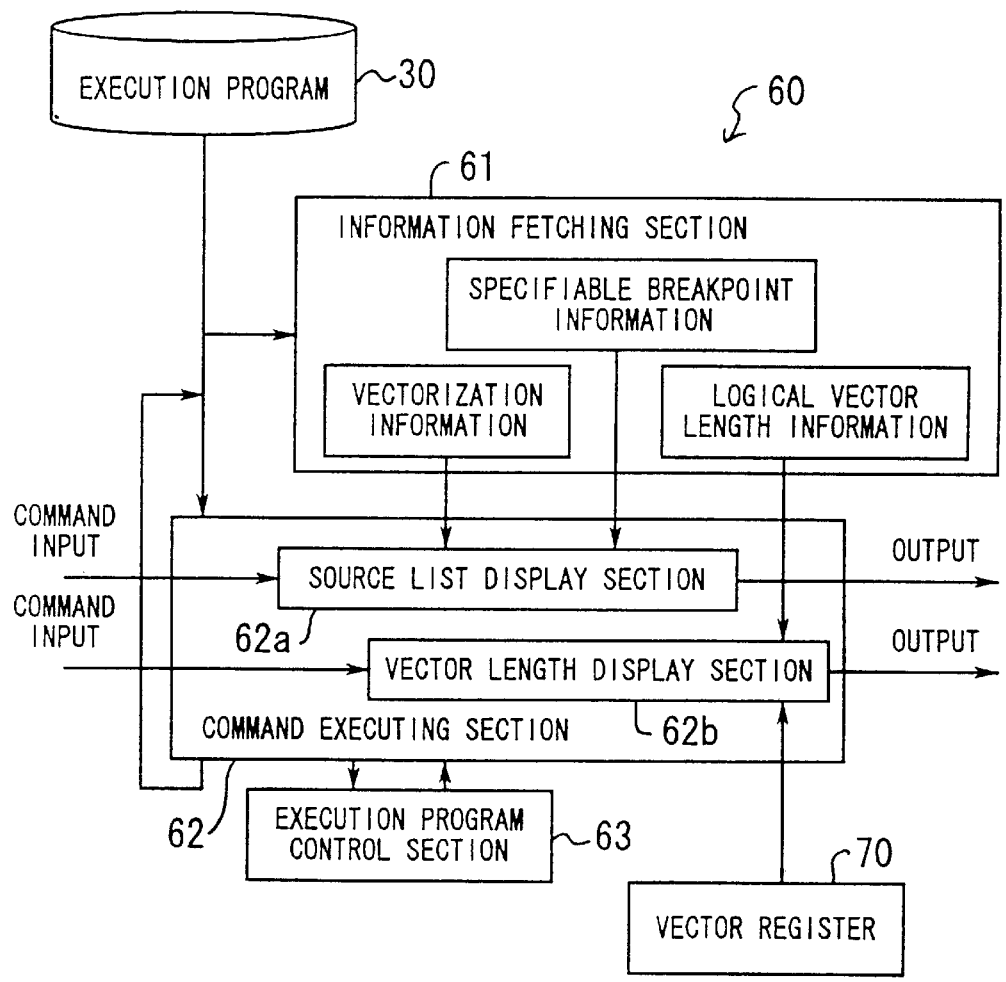
FIG. 5 is a diagram showing an example of debugger configuration.

FIG. 5 illustrates an example of how a debugger 60 is configured in accordance with the present invention. The debugger 60 is, in a preferred embodiment, software executed by the computer 52 shown in FIG. 3.

The debugger 60 of the present invention as illustrated in FIG. 5 comprises an information fetching section 61 fetching the debugging information from the execution program 30, a command executing section 62 executing a command input by the user, and an execution program control section 63 controlling the execution program 30. The command executing section 62 includes a source list display section 62a and a vector length display section 62b. Also, the command executing section 62 is connected to a vector register 70 which stores real vector length information obtained when the execution program 30 is executed.

When the debugger 60 is started, the execution program control section 63 starts to execute the execution program 30. At this time, the information fetching section 61 fetches the debugging information from the execution program 30, and then extracts the vectorization information, the specifiable breakpoint information, and the logical vector length information from the debugging information. The extracted information is in practice stored in a memory, such as memory 54, and not shown in FIG. 5. This memory has a breakpoint information setting table for recording breakpoint information set by the user, though not shown. The command executing section 62 thereafter waits for a command input while looping.

When a command to display the source list is input to the command executing section 62, the source list display section 62a reads the vectorization information fetched by the information fetching section 61, extracts from the vectorization information for information about the degree of vectorization, that is, a vectorizing degree classification code " ", "V", "M" or "S", and outputs the extracted classification code. Also, the source list display section 62a reads the specifiable breakpoint information fetched by the information fetching section 61 and the breakpoint information in the breakpoint information setting table set by the user, and outputs the breakpoint information. The vectorizing degree information and the breakpoint information output in this manner are thereafter affixed (or attached) to a source code of the source program and displayed.

On the other hand, when a command to display the logical and real vector lengths is input to the command executing section 62, the vector length display section 62b reads the logical vector length information fetched by the information fetching section 61 and the real vector length information retained by the vector register 70, and outputs the thus-read information. The readout of the real vector length information from the vector register 70 is controlled by the execution program control section 63. The execution program control section 63 controls execution of the execution program 30 in the debugger 60.

A specific example of how a line as an object of vectorization and the vectorizing degree of the line are displayed is now described. First, debugging information created at the time of compiling is exemplified, and then an example of how the debugger displays information based on the debugging information is described.

Figure 6:
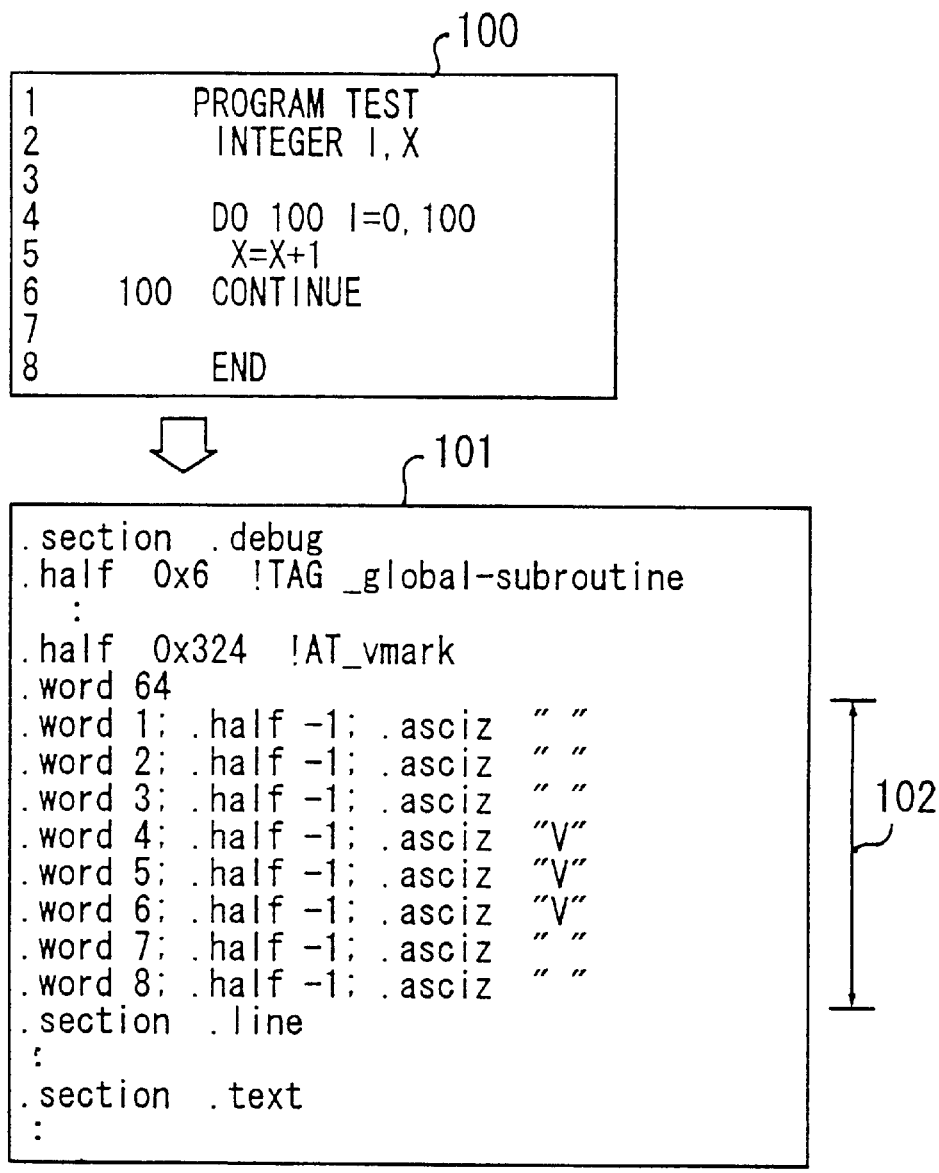
FIG. 6 is a diagram showing, by way of example, debugging information generated at the time of compiling.

FIG. 6 shows an example of debugging information generated at the time of compiling the source program 10.

FIG. 6 illustrates source code 100, included in the source program 10, and debugging information 101 necessary for displaying vectorization information generated based on the source code 100. In the source code 100, the numbers 1 to 8 to the left of individual lines represents line numbers. In the source code 100, a DO statement according to FORTRAN is shown by way of example. The DO statement signifies an instruction that the instructions up to the statement 100 should be repeated until I is incremented from 0 up to 100. The DO statement is a line to be vectorized.

In the debugging information 101, which is generated at the time of compiling the source code 100, a range 102 constitutes vectorizing object information. In the vectorizing object information, the numbers in "word 1" through "word 8" are line numbers corresponding to the respective lines in the source code 100. Next to each line number appears "half" which is a line position indicating what occurrence the statement is in the corresponding line. Ordinarily, one line has one statement described therein. In some cases, however, a plurality of statements are described in one line, in which case, the line position serves as position information indicating what occurrence the statement is in the line.

In the illustrated example, one statement is described in one line, and hence "–1" is indicated. The description following "asciz" represents the vectorizing degree classification code, and one of the aforementioned four classification codes is indicated here. This classification code is information which is required when the degree of vectorizing is displayed by the debugger 60.

FIG. 7 illustrates an example of how the vectorizing information is displayed by the debugger 60.

In a debugger display screen 103 shown in the FIG. 7, output by the debugger 60, and displayed on the display 50, ">" at the first line is a prompt indicating that the debugger 60 is waiting for a command input, and the subsequent "list" represents a source display command. When the source display command "list" is executed, the vectorizing object information associated with source lines to be displayed is shown by the vectorizing degree classification codes together with the source. For example, a space as a classification code, which is indistinguishable on the display, is in actuality affixed to each of the first to third lines of the source code, and the classification code "V" is affixed to each of the fourth to sixth lines. It is, therefore, possible for the user to readily learn in the debugger the lines to be vectorized and their vectorizing degrees with reference to the program source.

Figure 8:
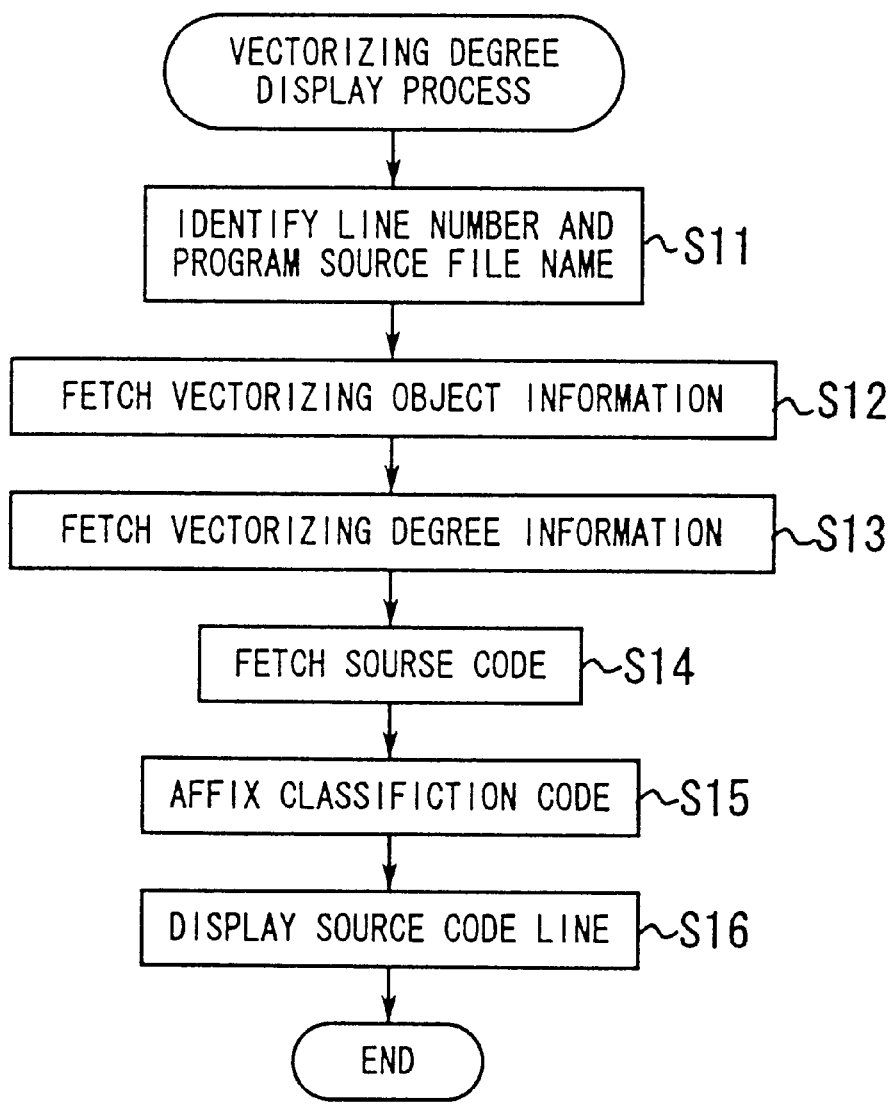
FIG. 8 is a flowchart showing a process of displaying vectorization information in the debugger.

FIG. 8 is a flowchart showing a process for displaying the vectorization information in the debugger 60. In a preferred embodiment, the foregoing process is implemented in software executed by the computer 52 shown in FIG. 3.

To display the degree of vectorization of a line, the line number and program source file name previously entered or analyzed in a command input environment of the debugger are first identified (Step S11). Then, vectorizing object information associated with the corresponding line number is fetched from the line number information associated with the identified source file name (Step S12), and vectorizing degree information is fetched from the vectorizing object information associated with the corresponding line number (Step S13). Subsequently, the source code of the corresponding line is fetched from the source file with the identified source file name (Step S14). One of the classification codes indicative of corresponding vectorizing degree information is then affixed to the source code of the line fetched in Step S14 (Step S15). Finally, the source code of the line with the vectorizing degree information affixed thereto is displayed (Step S16).

A specific example of displaying logical and real vector lengths is now described. Also in this example, debugging information created at the time of compiling is first exemplified, then an example of how the debugger 60 displays information based on the debugging information is described.

Figure 9:
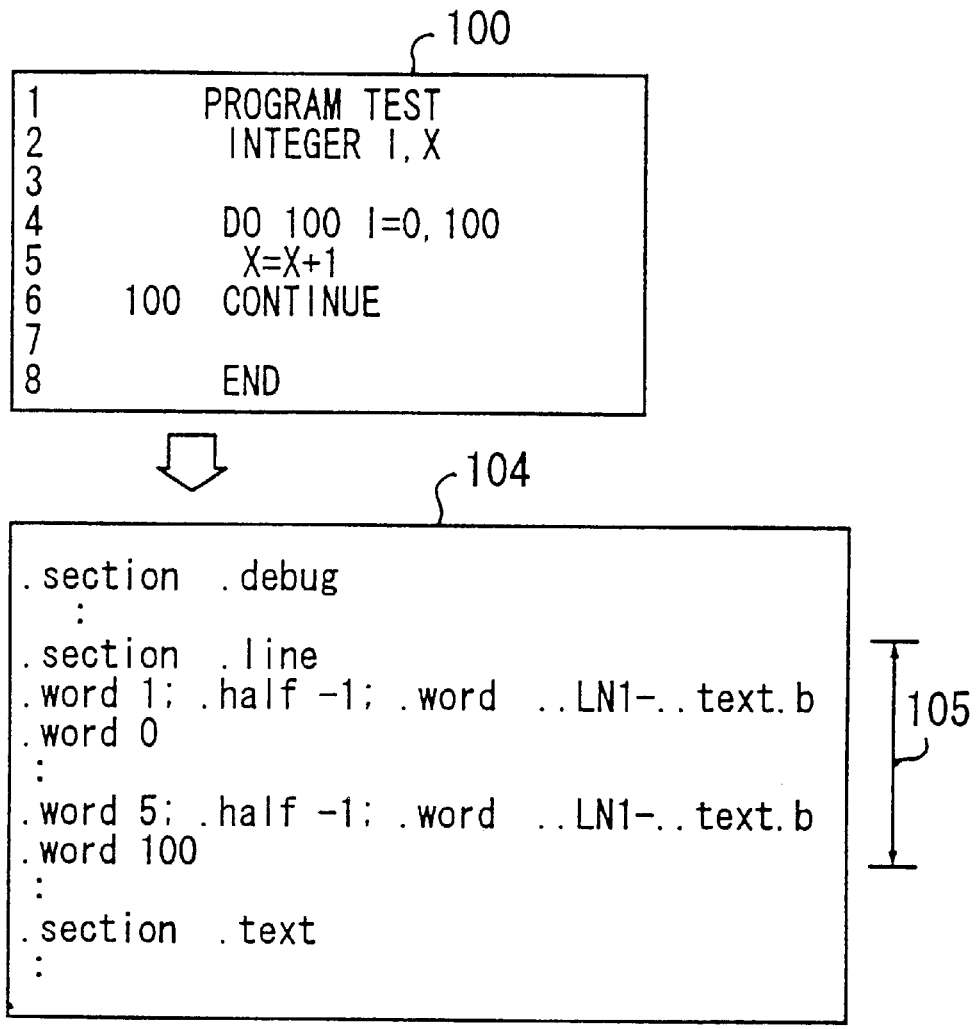
FIG. 9 is a diagram showing an example of debugging information generated at the time of compiling.

FIG. 9 shows an example of debugging information generated at the time of compiling the source program 10 by the compiler 20.

FIG. 9 shows the source code 100, and debugging information 104 generated by the debugger 60 based on the source code 100 and necessary for displaying logical vector lengths. In the debugging information 104, a range 105 constitutes logical vector length information. Like the aforementioned vectorizing object information, the logical vector length information retains length information about the logical vector length of each line and is recorded in the debugging information 104.

The logical vector length information is included in the section "line" of the debugging information 104, and comprises a line number indicated by "word", a line position indicated by "half", an offset indicated by "word . . . text.b", and a logical vector length indicated by "word". The illustrated example shows only the line number information of the first and fifth lines for simplicity of illustration. As for the line position, since only one statement is described in each of the corresponding lines in the source code 100, "–1" is defined. The offset is information indicating how many lines the line in question is separated from a reference position, that is, the beginning of the subroutine of the program shown in FIG. 9. The succeeding logical vector length includes a logical vector length calculated at the time of compiling. The foregoing are the items of information necessary for the debugger 60 to display logical vector lengths.

FIG. 10 shows an example of how the debugger 60 displays information about logical and real vector lengths.

In a debugger display screen 106 shown in FIG. 10, output by the debugger 60 and displayed on the display 50, the first two lines are information displayed in order to inform the user of the line position at which the execution program is being interrupted. The illustrated example indicates that the execution program is interrupted at the fifth line, and the source list at the fifth line is also shown.

When the vector length display command "show vl" is executed, the debugger display screen 106 simultaneously displays the logical vector length information and the real vector length information. Consequently, the logical vector length defined at the time of translation and the real vector length during actual execution of the program can both be acquired in the debugger 60 at the same time.

Figure 11:
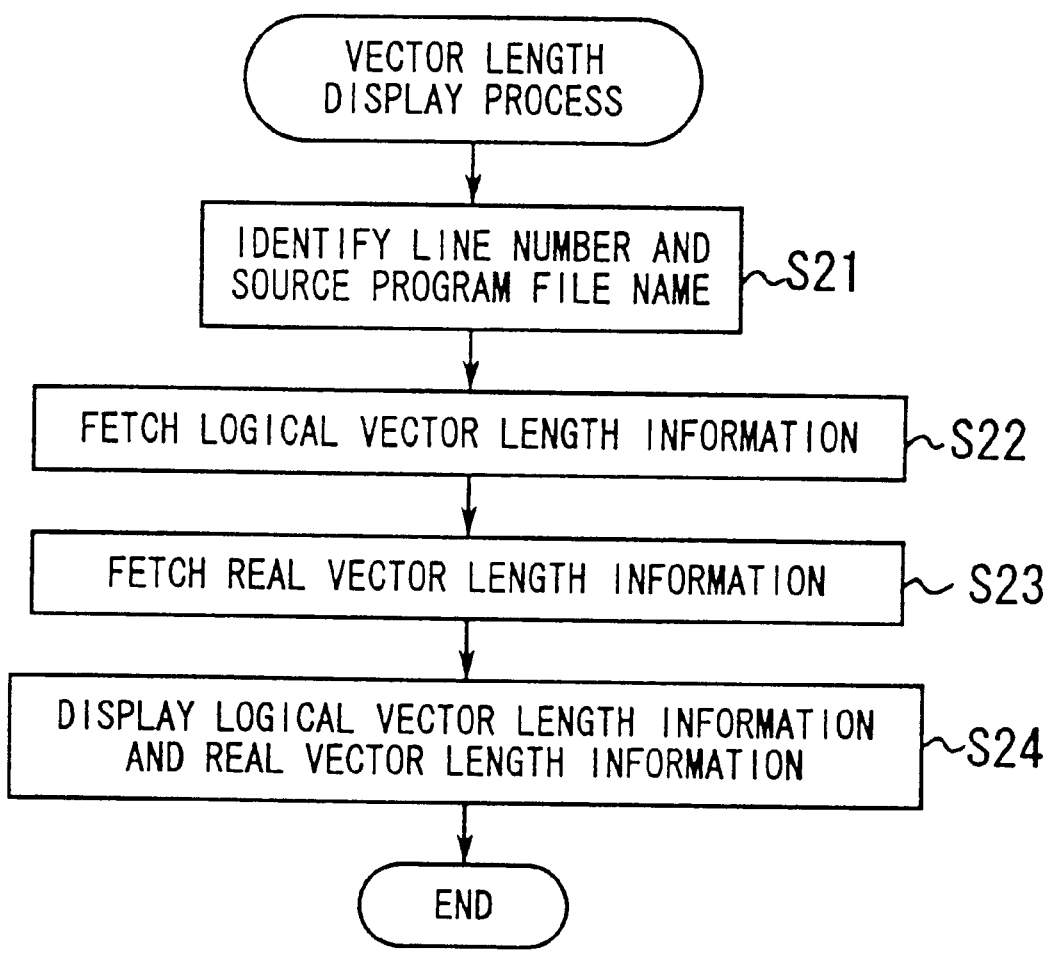
FIG. 11 is a flowchart showing a process of displaying vector length information in the debugger.

FIG. 11 is a flowchart showing a process for displaying the vector length information in the debugger 60. The foregoing process, in a preferred embodiment of the present invention, is software executed by the computer 52 shown in FIG. 3.

To display logical and real vector lengths while the debugger 60 of the present invention is used, a line number (in the above example, the fifth line) and a source program file name are first identified for a current break environment of the execution program (Step S21). Subsequently, logical vector length information associated with the corresponding line number is fetched from the line number information associated with the identified source file name (Step S22), and real vector length information in the current break environment is fetched from the vector register (Step S23). The thus-fetched logical vector length information and real vector length information are then displayed (Step S24).

A specific example of displaying specifiable breakpoints and set breakpoints is now described. Also in this example, debugging information created at the time of compiling is first exemplified, and then an example of how the debugger displays information based on the debugging information is described.

Figure 12:
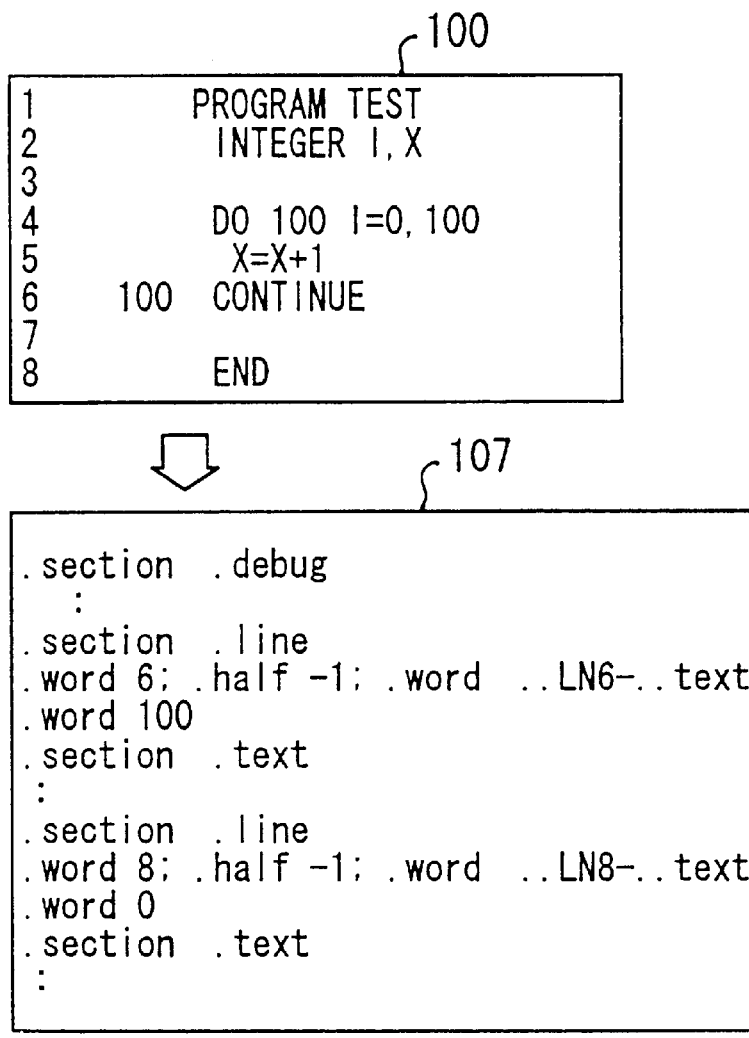
FIG. 12 is a diagram showing an example of debugging information generated at the time of compiling.

FIG. 12 shows an example of debugging information generated at the time of the compiling of the source program 10.

FIG. 12 shows the source code 100, and debugging information 107 generated by the debugger 60, and displayed on the display 50, based on the source code 100 and necessary for displaying specifiable breakpoints. In the debugging information 107, a range 108 constitutes specifiable breakpoint information. The specifiable breakpoint information has exactly the same format as the logical vector length information, and comprises a line number indicated by "word", a line position indicated by "half", an offset indicated by "word . . . text.b", and a logical vector length indicated by "word". In the specifiable breakpoint information, the presence of the first line number, the line position and the offset indicates that a breakpoint can be set at the corresponding line. The illustrated debugging information 107 shows only the line number information of the sixth and eighth lines for simplicity of illustration. As is clear from the FIG. 12, a breakpoint can be set at each of the sixth and eighth lines.

FIG. 13 shows an example of how the debugger 60 displays the breakpoint information, in accordance with the present invention.

In a debugger display screen 109 shown in FIG. 13, output by the debugger 60 and displayed on the display 50, the command "break" to set a breakpoint is executed together with a line number with respect to which the breakpoint is to be set. In the illustrated example, the sixth line is specified as a line at which a breakpoint is to be set. Set breakpoint information thus executed by the breakpoint set command is stored in the breakpoint information setting table included in the debugger 60. Accordingly, the result of execution of the breakpoint set command is displayed at the second and third lines of the display screen 109. The display screen 109 shows that the set breakpoint is at the sixth line and also shows the source program 10 list at the sixth line.

If, in this case, the source program display command "list" is executed, the source program is displayed on the debugger display screen 109 with information about specifiable breakpoints and set breakpoints attached to corresponding source program lines of code. Concurrently, the vectorizing degree classification codes are also displayed. In the illustrated display screen 109, "−" represents a specifiable breakpoint which can be set, and "*" represents a breakpoint which has already been set. Accordingly, the illustrated example of FIG. 13 indicates that a breakpoint can be set for each of the first, fourth to sixth, and eighth lines of the source code 100. Further, the illustrated example of FIG. 13 also shows that for the sixth line, a breakpoint has already been set. It is, therefore, possible for the user to learn readily from the debugger 60 the information about specifiable breakpoints and set breakpoints with reference to the source program 10.

Figure 14:
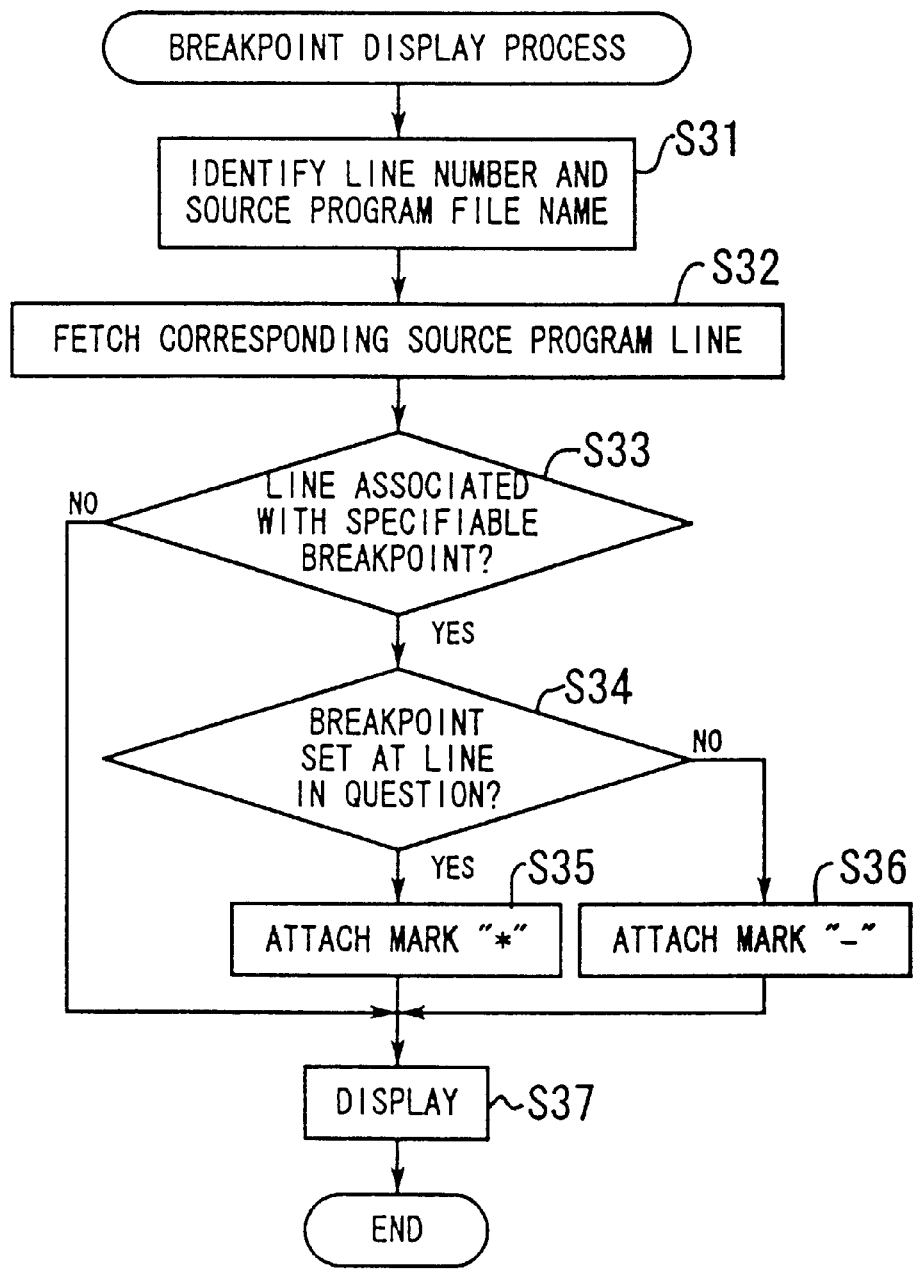
FIG. 14 is a flowchart showing a process for displaying breakpoint information in the debugger.

FIG. 14 is a flowchart showing a process for displaying the breakpoint information in the debugger 60. In a preferred embodiment, the foregoing process is implemented in software executed by the computer 52 shown in FIG. 3.

To display specifiable breakpoints and set breakpoints while the debugger is used, the line number and source program file name previously entered or analyzed in a command input environment of the debugger 60 are first identified (Step S31). Then, a corresponding source program line is fetched from a file with the identified source program file name (Step S32). Based on the line number information associated with the identified source program file name, whether the line in question is associated with specifiable breakpoint information is determined, that is, whether the line includes a line number, a line position and an offset is determined (Step S33).

If the specifiable breakpoint information exists, then a determination is made as to whether a breakpoint has been set at the line in question, that is, whether or not the breakpoint information setting table in the debugger retains information indicating that a breakpoint has been set at the line in question (Step S34).

If the breakpoint has been set, the mark "*" is attached to the corresponding source program line (Step S35). On the other hand, if the breakpoint has not been set, the mark "−" is attached to the program source line (Step S36). Then, for the program source line which is determined not to be associated with specifiable breakpoint information in Step S33, only the program source line is displayed; however, for the source program line which is associated with specifiable breakpoint information, the source program line is displayed with the mark "−" or "*" attached thereto (Step S37).

As described above, the debugging information display device of the present invention comprises, as part of the compiler, the vectorizing line extractor, the vectorizing degree analyzer and the breakpoint-logical vector length information fetching unit. Also in accordance with the debugging information display device of the present invention, debugging information is attached to the execution program output by the compiler, whereby the necessary program source file and various items of debugging information are obtained from the execution program alone while the debugger 40 is used, and perfect consistency between the actual execution program and the debugging information is ensured.

Since the debugger of the present invention is provided with the vectorizing degree fetching unit, lines to be vectorized and their vectorizing degree information fetched from the debugging information can be displayed at the same time when a command is executed to display the program source lines. The vectorizing status is easily determined, and the displayed information can be utilized for debugging the source program and for improving the performance of the source program.

Also, the debugger of the present invention is provided with the logical vector length analyzer and the real vector length fetching unit. Therefore, while the execution program is interrupted, both the logical and real vector lengths are displayed at the same time, permitting comparison between the two. Accordingly, deterioration in the performance of the program, which is caused when the vector length during actual execution is shorter than the logically determined vector length, is detected with accuracy. Thus the displayed information is utilized for debugging the program and also for improving the performance of the program.

Further, the debugger of the present invention is provided with the breakpoint setting unit and the breakpoint information analyzer. Therefore, when the source program is displayed, set breakpoints can be concurrently displayed, thereby specifically showing the breakpoint settings and making it possible to readily learn the debugging status. Since specifiable breakpoints are also displayed, a breakpoint is prevented from being set at an erroneous position, permitting smooth breakpoint setting.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A debugging information display device comprising:

vectorizing line extracting means for detecting a loop structure in a source program when the source program is translated by compiling execution means, thereby extracting a vectorizing line to be vectorized;

vectorizing degree analyzing means for analyzing a degree of vectorizing with respect to a source of the extracted vectorizing line, and affixing, as debugging information, information about the analyzed vectorizing degree to an execution program including a program section created by the compiling execution means;

vectorizing degree fetching means for fetching the vectorizing degree information from the debugging information of the execution program;

information affixing means, supplied with the source program and the fetched vectorizing degree information, for affixing the vectorizing degree information to a corresponding line of the source program; and display means for displaying the source program with the vectorizing degree information affixed thereto., breakpoint information, logical vector length, and real vector length.

2. The debugging information display device according to claim 1, further comprising:

breakpoint-logical vector length information fetching means for fetching length information about a logical vector length, which is defined when the source program is translated by the compiling execution means, and information about breakpoints, and for providing the execution program with the fetched information as debugging information;

real vector length fetching means for fetching information about a real vector length in a current break environment of the execution program and for outputting the fetched information to said display means; and logical vector length analyzing means for fetching the logical vector length information in a current break environment from the debugging information of the execution program and for outputting the fetched information to said display means.

3. The debugging information display device according to claim 2, further comprising:

breakpoint setting means for setting the breakpoint information during debugging; and breakpoint information analyzing means for determining based on the debugging information of the execution program whether each line of the source program is associated with specifiable breakpoint information or not when the source program is displayed, for causing said information affixing means to display, together with line information of the source program to be displayed, information indicating that a breakpoint can be set if a line is associated with the specifiable breakpoint information, and for displaying, together with line information of the source program to be displayed, information indicating that a breakpoint has already been set if the information set by said breakpoint setting means indicates breakpoint setting.

4. An apparatus comprising:

a memory storing a source program; and a debugging information display device compiling the source program, extracting lines of the source program to be vectorized, determining a degree of vectorizing of the lines, determining specifiable breakpoint information, affixing the degree of vectorizing and the specifiable breakpoint information to the source program, and displaying the source program concurrently with the degree of vectorizing, the specifiable breakpoint information, wherein the degree of vectorizing is one of non-target, perfect vectorizing, partial vectorizing, and non-vectorizing.

5. The apparatus according to claim 4, wherein the debugging information display device further comprises a display displaying the source program concurrently with the degree of vectorizing and the specifiable breakpoint information.

6. The apparatus according to claim 4, wherein the debugging information display device compiles the source program into an execution program and debugging information, and further comprises a debugger fetching the debugging information, executing a command input by a user, and controlling execution of the execution program.

7. The apparatus according to claim 6, wherein the debugger comprises:

an information fetching section fetching the debugging information from the execution program;

a command executing section execution the command input by the user; and an execution program control section controlling the execution program.

8. An apparatus comprising:

a computer comprising a program development system comprising:

a compiler compiling a source program, outputting an execution program, and comprising:

a compiling execution unit compiling the source program, a vectorizing line extractor extracting vectorizing lines, a vectorizing degree analyzer analyzing a degree of vectorizing of the vectorizing lines with respect to the source program and outputting debugging information based thereon, a breakpoint-logical vector length information fetching unit fetching information about logical vector lengths and breakpoints, defined at the time of compilation of the source program, and outputting the fetched information as debugging information based thereon;

a debugger comprising:

a vectorizing degree fetching unit fetching the vectorizing information from the debugging information, a real vector length fetching unit fetching real vector length information during a current break environment of the execution program, a logical vector length analyzer extracting logical vector length information during the current break environment from the debugging information of the execution program, a breakpoint setting unit setting breakpoint information, a breakpoint information analyzer extracting the specifiable breakpoint information from the debugging information of the execution program, and an information affixing unit attaching the one of the vectorization information and the specifiable breakpoint information to the source program, wherein the degree of vectorizing is one of non-target, perfect vectorizing, partial vectorizing, and non-vectorizing; and a display displaying the source program, the breakpoint information, the logical vector length, and the real vector length.

9. The apparatus according to claim 8, further comprising a display displaying the source program, the vectorizing information, and the specifiable breakpoint information.

10. The apparatus according to claim 8, further comprising a display displaying the logical vector length information and the real vector length information.

11. A method of displaying debugging information by a computer, comprising the steps of:

compiling by a debugging information display device a source program into an execution program;

extracting by the debugging information display device lines of the source program to be vectorized;

determining by the debugging information display device a degree of vectorizing of the lines;

determining by the debugging information display device specifiable breakpoint information;

affixing by the debugging information display device the degree of vectorizing and the specifiable breakpoint information to the source program; and displaying by the debugging information display device the source program concurrently with the degree of vectorizing, the specifiable breakpoint information, logical vector length, and real vector length, wherein the degree of vectorizing is one of non-target, perfect vectorizing, partial vectorizing, and non-vectorizing.

12. The method according to claim 11, further comprising the step of:

displaying logical vector length information and real vector length information of the source program.

13. The method according to claim 11, further comprising the steps of:

fetching debugging information from the execution program;

executing a command input by a user; and controlling the execution program based on the command input by the user.

14. A method of displaying debugging information by a computer, comprising the steps of:

compiling by a debugging information display device a source program into an execution program; and displaying by the debugging information display device the source program concurrently with a degree of vectorizing, a specifiable breakpoint information of the source program, logical vector length, and real vector length, wherein the degree of vectorizing is one of non-target, perfect vectorizing, partial vectorizing, and non-vectorizing.

15. The method according to claim 14, further comprising the step of:

displaying logical vector length information and real vector length information of the source program.

16. The method according to claim 14, further comprising the steps of:

fetching debugging information from the execution program;

executing a command input by a user; and controlling the execution program based on the command input by the user.

* * * * *

UNITED STATES PATENT AND TRADEMARK OFFICE
CERTIFICATE OF CORRECTION

PATENT NO.: 5,987,248
DATED : November 16, 1999
INVENTOR(S): Norihisa MURAYAMA, et al.

It is certified that error appears in the above-identified patent and that said Letters Patent is hereby corrected as shown below:

IN THE CLAIMS:

Claim 4,    Column 12,   line 7,
          after "information," insert --the logical vector length, and the real vector length,--.

Signed and Sealed this

Ninth Day of May, 2000

Attest:

Q. TODD DICKINSON

Attesting Officer      Director of Patents and Trademarks